FIG. 1

INVENTOR.
WALTER R. FRIED
TED G. SPRAGUE

INVENTORS
WALTER R. FRIED
TED G. SPRAGUE

BY

ATTORNEY

INVENTORS
WALTER R. FRIED
TED G. SPRAGUE

ATTORNEY

INVENTORS
WALTER R. FRIED
TED G. SPRAGUE

United States Patent Office 3,341,847
Patented Sept. 12, 1967

3,341,847
PLATFORM MOTION COMPENSATION OF A COHERENT MTI SYSTEM
Walter R. Fried, Santa Ana, and Ted G. Sprague, Fullerton, Calif., assignors to North American Aviation, Inc.
Filed May 24, 1966, Ser. No. 552,556
13 Claims. (Cl. 343—7.5)

ABSTRACT OF THE DISCLOSURE

In a directionally ranging pulsed energy system, means for improving the indicated distinction between a clutter background and a detected moving target moving radially of the pulsed energy system relative to the clutter background, in which the pulse repetition frequency of the pulsed energy system is continuously varied or compensatorily adjusted in accordance with the relative motion of the clutter background relative to the pulsed energy system.

Background of the invention

In the airborne application of directionally-ranging, pulsed-energy systems, such as radar systems, it is often necessary to detect and locate small moving targets against a large clutter background. Where such a moving target is moving radially of the radar system relative to the clutter background, such detection of the target is sought by means of the difference in the respective Doppler shifts of the echo return signals from such target and the clutter background, as is well understood in the art.

In the case of a stationary system such as a ground-based radar, the spectral content of a received signal due to ground clutter is essentially the same as that of the transmitted pulse and only the spectral content of the received signal due to the moving target is Doppler-shifted. Where, however, the utilizing radar is mounted on a moving platform, such as a high-speed aircraft, the received ground clutter undergoes a Doppler shift similar to any other target which maintains a relative velocity relative to the radar platform. In other words, both the clutter spectra and moving target spectra will be commonly frequency translated, or Doppler-shifted, as a function of the platform velocity.

In the prior art of airborne target indicators (AMTI) employing coherent radars (in which the receiver comprises a phase detector responsive to the phase, as well as the frequency, of the transmitted energy), the frequency of a coherent oscillator (COHO) is shifted to compensate for the Doppler shift of the clutter spectra (and target spectra) due to platform (vehicle) velocity and orientation. In this way, zero frequency rejection (i.e., fixed high-pass) filters may continue to be employed for clutter rejection. Such compensatory frequency shift is accomplished by mixing the output of the COHO with a signal from a tunable oscillator, the frequency of which is controlled by a calibrated control source responsive to vehicle speed and antenna orientation. For example, previous methods for motion compensating coherent AMTI radars include sideband modulation techniques which have instrumentation disadvantages because of the practical difficulties of obtaining sufficient modulator balance, carrier rejection and sideband rejection. Alternatively, pulse-doppler AMTI radars may employ a tunable clutter rejection filter, the tuned frequency of which is controlled by the above described calibrated control signal source. Such prior art AMTI techniques of a tunable Doppler frequency oscillator and a tunable clutter rejection filter are more fully described on pages 155 to 162 of "Introduction to Radar Systems" by Skolnik, published by McGraw-Hill (1962).

The advantage of a coherent radar is the improved signal-to-noise ratio performance thereof. However, a common disadvantage of the above described methods for compensation of the platform motion of a coherent AMTI radar system is the reliance upon accurate calibration of an open-loop system. A more serious disadvantage is the occurrence of blind-speeds or moving target Doppler shifts which correspond to harmonics or integer multiples of the clutter Doppler shift, whereby at certain target velocities the moving target spectra may not be detected because (1) it is submerged in the bandwidth of the clutter spectra and (2) is rejected therewith by such clutter rejection means.

In a non-coherent radar AMTI system, unipolar video detection of the received signals inherently provides a clutter-referenced periodic range trace signal (i.e., the substantial clutter component of the detected signal occurs at DC or low frequency, and the unipolar video-detected, moving-target signal occurs at a frequency corresponding to a difference frequency, or beat frequency difference, between the Doppler-shifted clutter spectra and Doppler-shifted moving target spectra. In this way, a zero frequency rejection (i.e., fixed high-pass) filter may be used for clutter rejection without the necessity of the platform compensation means associated with prior art coherent radar AMTI systems. Such non-coherent radar AMTI techniques are discussed in U.S. patent application, Ser. No. 391,073 filed Aug. 18, 1964 by F. J. Dynan et al., assignors to North American Aviation, Inc., assignee of the subject invention.

While an advantage of non-coherent radar AMTI techniques is that platform motion compensation is not ordinarily required, such technique suffers from the disadvantage of not providing the high signal-to-noise ratio performance of a coherent radar. Further, such non-coherent radar AMTI technique is yet subject to blind-speed performance areas for those target speeds resulting in a target-clutter beat frequency lying within a clutter-clutter beat frequency spectrum, similarly as the coherent radar AMTI case, resulting in a lower available target window area.

By means of the concept of the subject invention, the advantages of coherent data processing may be employed without suffering the disadvantages of prior art coherent radar AMTI systems. The pulse repetition rate of a pulsed energy, coherent radar system is adjusted or servoed to the Doppler shift of the clutter spectra, whereby the "blind speed" region of an AMTI processor is minimized and a moving target may be detected over a maximum range of target radial velocities relative to the radar platform.

In a preferred embodiment of the subject invention, there is provided a directionally ranging pulsed energy system. There is also provided means for improving the distinction between a clutter background and a detected target moving radially of the pulsed energy system relative to the clutter background and comprising means for adjusting a pulse repetition frequency of the pulsed energy system in accordance with the relative motion of the clutter background. Such motion is indicated by means responsive to the sense of the frequency difference between the Doppler-shifted clutter spectra and the transmitted carrier frequency, for adjusting the pulse repetition frequency of the pulsed energy system to a frequency corresponding to an integer submultiple of the clutter Doppler shift.

By means of the above described arrangement, a clutter referenced signal is obtained prior to video detection, whereby coherent radar AMTI means may be employed without other platform motion compensation means. Also, because the coherently detected signal provided by such arrangement is clutter-referenced, fixed bandpass, low-frequency rejection filters may be used for AMTI processing. Further, because the pulse repetition rate of the coherent pulsed-energy system is adjusted to an integer submultiple of the clutter Doppler shift, "blind speed" regions within the spectra of the received signals (due to frequency coincidence of clutter and target beat frequency spectra) are reduced, permitting surveillance of moving targets over a maximum range of target radial velocities relative to the radar platform. Moreover, because such adjusted pulse repetition frequency is proportional to the clutter Doppler shift, such frequency may be employed in a navigation application as indicative of the ground speed of the radar platform or a utilizing vehicle.

Accordingly, it is an object of the subject invention to provide improved platform motion compensation means for a coherent pulsed energy ranging system.

It is another object to provide an improved coherent AMTI system.

It is still another object of the invention to provide AMTI means having reduced "blind speed" regions of performance.

It is a further object of the invention to provide coherent radar means having increased utility for navigation purposes, including the accurate measurement of vehicle velocity.

It is a still further object of the invention to provide means for adjusting the pulse repetition frequency of a pulsed energy system to an integer submultiple of a Doppler shift of a clutter return signal.

These and other objects of the invention will become apparent from the following description taken together with the accompanying drawings, in which.

In the figures, like reference characters refer to like parts.

Figure 1:
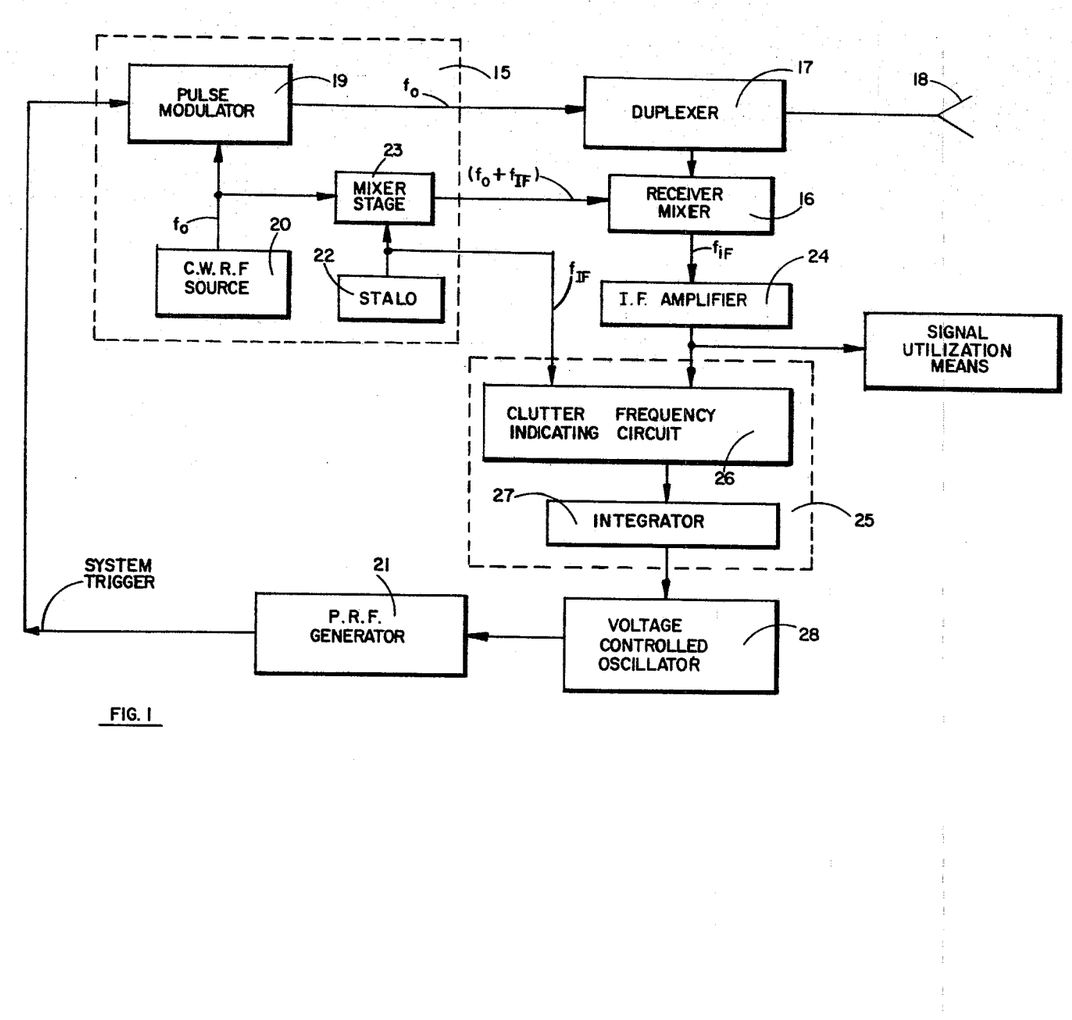
FIG. 1 is a block diagram of one aspect of the inventive concept.

Referring now to FIG. 1, there is illustrated a block diagram of a system embodying one aspect of the invention. There is provided a coherent radar system comprising a coherent pulsed energy transmitter 15, receiver mixer 16, and a duplexer 17 which couples transmitter 15 and receiver 16 to a directional antenna 18. Coherent transmitter 15 comprises a pulse modulator 19 for modulation of the carrier frequency output of a continuous wave source 20 of radio frequency energy ($f_o$) in response to periodic pulse inputs from a pulse repetition frequency or system trigger generator 21. The carrier frequency output ($f_o$) of RF source 20 is mixed with the output of a stable local oscillator (STALO) 22 having a frequency ($f_{IF}$) corresponding to a preselected receiver intermediate frequency, by means of a mixer stage 23 to provide a suitable local oscillator input to receiver-mixer 16. The difference frequency between the applied local oscillator and received signal inputs to receiver-mixer 16, is then amplified by an intermediate frequency amplifier 24 and fed to frequency tracking means 25.

Frequency tracking means 25 comprises coherent means responsive to the frequency difference between a detected clutter spectrum and the transmitted carrier frequency for providing a control signal indicative of the time integral of the frequency difference between the respective inputs thereto. Such frequency tracking means 25 includes a clutter Doppler shift indicating circuit 26 responsive to the intermediate frequency received signal output of amplifier 24 and an intermediate frequency coherent source provided by STALO 22, for providing a coherently detected output signal which is integrated by integrating means 27. The control signal output of integrating means 27 is then applied to the control input of a voltage-controlled oscillator 28, the periodic output of which oscillator controls the periodicity of the system trigger output generated by pulse generator 21.

The construction and arrangement of elements 15, 16, 17, 18, 21, 24 and 28 are well known in the art and therefore have been illustrated in block form only for convenience in exposition. The arrangement and cooperation of frequency tracker 25 will be described more fully hereinafter, in connection with the description of FIG. 4.

In normal operation of the arrangement of FIG. 1, the output of integrator 27 is applied to oscillator 28 in such a sense as to cause the magnitude of the input to integrator 27 to decrease. In other words, the intermediate frequency translated, Doppler-shifted input to difference frequency sensitive circuit 26 from amplifier 24 will, in general, vary from the intermediate reference frequency of STALO 22 as a function of the amount of the Doppler-shift and of the system pulse repetition frequency (PRF). The centroid of the spectrum of such Doppler-shifted intermediate frequency input signal corresponds substantially to the center frequency of the clutter spectra, due to the larger energy level thereof, relative to the return from a small moving target. Therefore, frequency tracker 25 responds to substantially only the clutter spectra center frequency of the received signal, in adjusting the system PRF. In this way the system PRF is maintained at an integer submultiple of the clutter Doppler-shift, as may be more fully appreciated from a consideration of FIGS. 2 and 3.

Figure 2A:
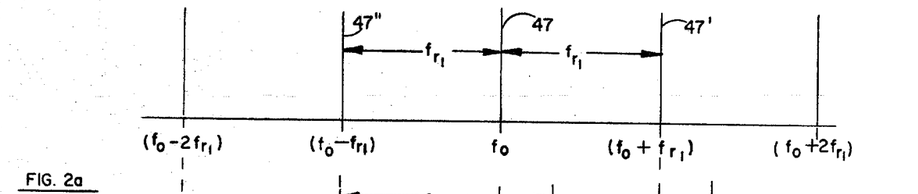
FIGS. 2a and 2b are a family of representative spectral response diagrams of a pulsed energy system having a fixed pulse repetition frequency.
Figure 2B:
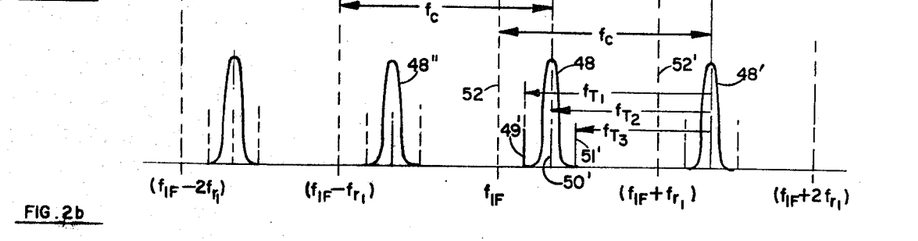
Figures 3A, 3B, 3C:
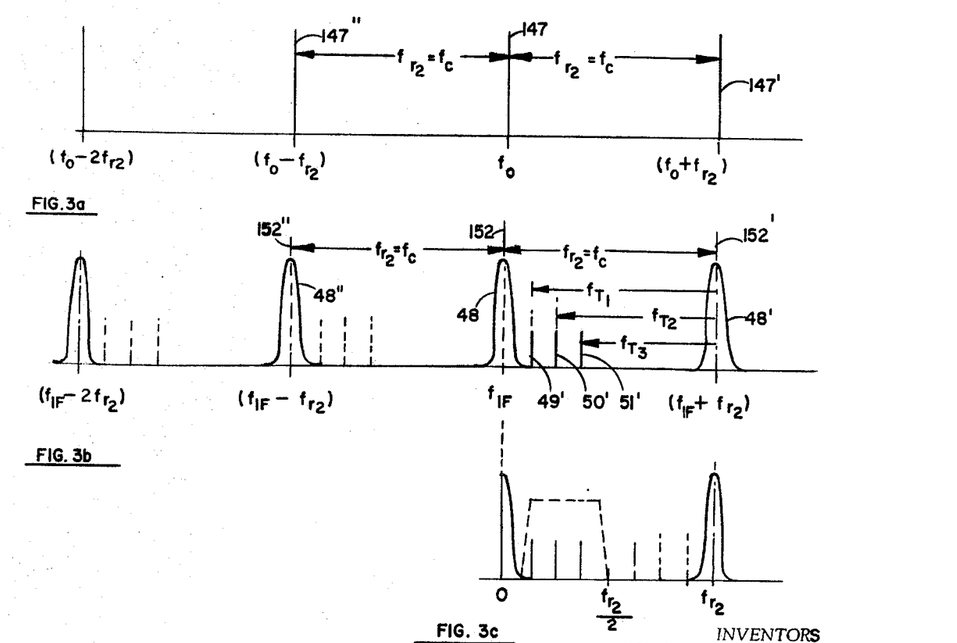
FIGS. 3a, 3b and 3c are a family of exemplary spectral response diagrams, illustrating the response of the system of FIG. 1 in a preferred mode of operation.

Referring to FIGS. 2 and 3 there are illustrated families of spectral responses of the radar system of FIG. 1. In FIG. 2, there is illustrated the response of a pulsed radar system transmitting a carrier-frequency $f_o$ at an arbitrary pulse repetition frequency $f_{r_1}$, and mounted on an airborne moving platform having a resolved velocity along the antenna boresight direction corresponding to a Doppler shift $f_c$ of the clutter return signals received from the terrain. In FIG. 2a, lines 47 represent a portion of the transmitted spectra ($f_o \mp n f_{r_1}$), illustrating the effect of the pulse repetition frequency ($f_{r_1}$) upon the transmittal carrier $f_o$.

The received spectrum of frequencies, translated in frequency by the IF receiver stage (elements 23 and 24) of the system of FIG. 1, is shown in FIG. 2b, the IF center frequency ($f_{IF}$) corresponding to the carrier frequency ($f_o$). In other words, that portion of the received spectrum comprising energy at the carrier frequency ($f_o$) is represented in FIG. 2b at the IF center frequency, and spectral components of the received energy occurring above and below the carrier frequency ($f_o$) are shown in FIG. 2b as similarly occurring above and below the IF center frequency. The IF spectral lines of the received energy are seen to be illustrated in FIG. 2b by several envelopes. The first and larger cusps 48 represent the return due to a substantial amount of groundclutter, each cusp having a center frequency corresponding to an associated one of the transmitted spectral lines 47 of FIG. 2a and shifted from a corresponding intermediate frequency by an amount ($f_c$) corresponding to the Doppler shift produced by the platform motion (vehicle speed) relative to the point scatterers of the terrain. A cusp or frequency spread occurs about the clutter spectral lines due to the variation of Doppler shift contributed by variations in direction of the terrestial point scatterers within the antenna beamwidth, as is well understood in the art. The lesser spectral lines 49′, 50′ and 51′ about a received cusp correspond to the lesser energy return from respective ones of three small moving targets occurring within the beamwidth of the radar system of FIG. 1. The frequency spacing or interval $f_{T_1}$, $f_{T_2}$ and $f_{T_3}$, illustrated between a respective one of target spectral lines 49′, 50′ and 51′ and the clutter cusp 48′ associated with a given IF spectral line (say line 52 at ($f_{IF}+f_{r_1}$)) indicates that such targets are moving at different radial speeds of the radar platform relative to the ground clutter.

The illustrated spectral situation of FIGS. 2a and 2b depicts a clutter Doppler shift of more than the system PRF ($f_c > f_{r_1}$), corresponding to a forward looking radar moving in a forward direction toward a clutter patch; while the several Doppler-shifted target spectral lines 49′, 50′ and 51′ occurring at a frequency below that of the associated clutter cusp 48′ and above that of the associated IF spectral line 52 represent moving targets toward which the radar platform is moving more slowly than toward the ground clutter. Such moving targets are, in fact moving relative to the terrain in a direction away from the radar platform (as indicated by such spectral lines 49′, 50′ and 51′ occurring to the left of the associated clutter cusp 48′); but are not moving at a ground speed as fast as the radar platform ground. In other words, the situation depicted in FIG. 2b corresponds to a pursuit situation in which the range distance is closing. Another aspect of interest in the situation depicted in FIG. 2b is that the Doppler-shifted clutter cusp 48 associated with spectral line 52″, lies within the spectral region of the moving target spectral lines 49′, 50′ and 51′ whereby the lesser energy of line 50′ is even submerged in the energy of clutter cusp 48. Such situation is referred to in the art as a blind speed region, for the reason that moving targets having speeds corresponding to such region may not be observed by spectrally distinguishing line 50′ from cusp 48. Moreover, where a coherent Doppler processor is sought to be employed with the intermediate frequency receiver mixer 16 and amplifier 24 of FIG. 1 (whereby the intermediate frequency ($f_{IF}$) is translated to zero or DC), in cooperation with a fixed bandpass filter, platform motion compensation is required.

Referring to FIG. 3, an adjustment of the system PRF by the cooperation of the arrangement of FIG. 1 so as to maintain the pulse repetition frequency ($f_r$) at an integer submultiple ($1/n$) of the observed clutter Doppler shift ($f_c$), resolves the two problems of platform compensation and blind speed for a coherent radar; and a clutter-reference signal may be provided for display purposes by further detection and fixed bandpass processing of the intermediate frequency clutter referenced receiver signal. In other words, by increasing the pulse repetition frequency of generator 21 (in FIG. 1) to a value $$(f_{r_2} = f_c/n)$$

corresponding to the clutter Doppler shift $f_c$ (of FIG. 2b), as indicated in FIG. 3a, the center frequency of the IF clutter spectra now occurs at IF spectral lines corresponding to the transmitted spectra, as indicated in FIG. 3b. Accordingly, the clutter spectrum 48 is now removed from the bandwidth interval about the IF center frequency $f_{IF}$ corresponding to ($f_{IF} \mp f_{r_2}/2$), the Doppler region of interest ($0-f_{r_2}/2$) in further detection and Doppler-filter processing of the intermediate frequency signals. Moreover, by virtue of the increased PRF ($f_{r_2}$) in FIG. 3, not only are the clutter cusps 48, 48′, 48″ (etc.) of FIG. 2b translated to the IF-PRF lines 52, 52′, 52″ (etc.) of FIG. 3b, but the clutter cusp 48 associated with the transmitted spectral line 147″ ($f_o - f_{r_2}$) below the carrier frequency ($f_o$) is displaced in frequency from the spectral region in which the moving target spectral lines occur, thereby avoiding the blind speed situation depicted in FIG. 2b. In other words, blind speed situations are now limited to just those speeds corresponding to integer multiples of the clutter Doppler shift. For example, the target signal returns 49′, 50′ and 51′ are now in the clear window region.

Figure 4:
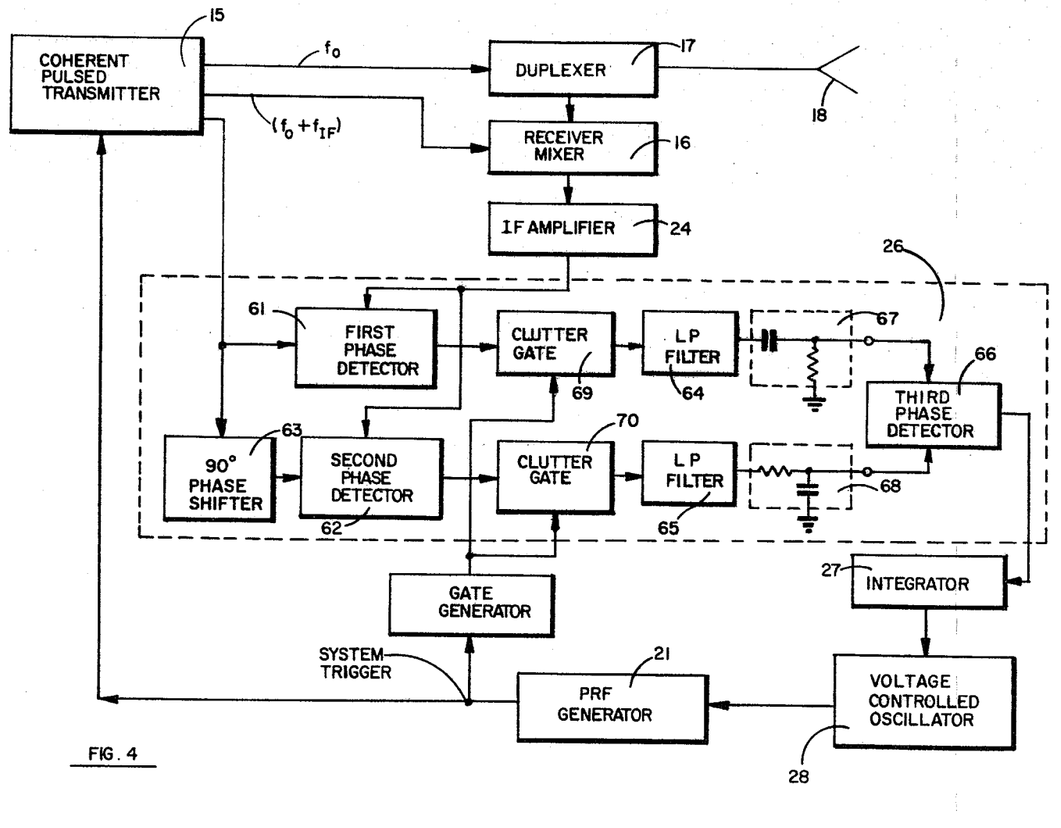
FIG. 4 is a block diagram of a system embodying the invention and showing in further detail the arrangement of the frequency tracking loop of FIG. 1.

The clutter frequency indicating circuit, by which the clutter frequency is determined relative to the system PRF, is shown more particularly in FIG. 4.

Referring to FIG. 4 there is illustrated in block diagram form a further embodiment of the system of FIG. 1, in which the clutter frequency tracking circuit is shown in more particularity. There are provided elements 15, 16, 17, 18, 21, 24, 26, 27 and 28 all constructed and arranged to cooperate substantially the same as like referenced elements of FIG. 1. Cutter frequency indicating means 26 is seen to comprise a first and second phase-sensitive detector 61 and 62, each having a first input commonly coupled to the intermediate frequency output of amplifier 24 and a second input responsive to the intermediate frequency coherent output signal of transmitter 15 for providing coherently detected output signals.

Interposed at the second input to second detector 62 is quadrature phase-shift means 63 for providing a quadrature phase-shift in time-phase at the intermediate frequency of the reference input thereto, relative to that of first detector 61. In other words, elements 61 and 62 provide a respective first and second bipolar video detected output signal, each of which is in a quadrature time-phase relation with the other. In this way, a phase-coherent signal output will be provided by at least one of the detectors, and the attenuation effects of variations in the phase of the received signals may be overcome. Such second signal is also useful in detecting changes in the Doppler shift of the clutter signal as will presently become more apparent. Each of the detected signal outputs of detectors 61 and 62 is filtered by a respective one of low pass filters 64 and 65 to provide an output indicative of only the beat frequency signals of interest. These signals are then combined and detected to provide a bipolar video output signal, the sense of which is indicative of the sense of the frequency difference between the clutter signal intermediate frequency and the intermeriate reference frequency, $f_{IF}$. The frequency discriminating means for detecting the sense of such frequency difference is comprised of a third phase-sensitive detector 66 having a first and a second input responsively coupled to the output of a respective one of first and second low pass filters 64 and 65. Interposed between each of filters 64 and 65 and an associated input of third phase detector 66 is means for adjusting the time-phase relationship between the inputs to the third detector 66 in a mutually quadrature time-phase relationship. Such means is comprised of a matched pair of high-pass and low-pass filters 67 and 68 which may be matched to provide a like gain. By constructing such filters as simple R-C networks, a mutually quadrature phase-shift is introduced at all common frequency inputs thereto, as may be demonstrated from the following:

Let:

$$G_1(s) = \frac{R}{RCs+1}$$

transfer function of the low pass filter and $$G_2(s) = \frac{1/Cs}{RCs+1}$$

transfer function of the high pass filter

Accordingly, the ratio may be indicated:

$$\frac{G_2}{G_1}(s) = RCs$$

wherein the operator $(jw)$ may be substituted for $(s)$, indicating the injection of a mutually quadrature phase-shift between the two inputs to detector 66. Now, because of the dual quadrature phase-shifts introduced by the singular frequency phase-shift means 63 and by the cooperation of high and low pass filters 67 and 68, it is to be appreciated that the two inputs to third detector 66 are in either an in-phase or anti-phase relationship, depending upon whether the clutter frequency is above or below the system PRF. Hence, the output of third phase detector 66 will be a bipolar video detected output, the sense or polarity of which is indicative of whether the clutter spectrum center frequency is above or below the system PRF or an integral multiple thereof. For example, the phase-detected low frequency output of first low pass filter 64 is indicative of the sine of the phase angle between the output of receiver amplifier 24 and the coherent reference signal $f_{IF}$ of transmitter 15, while the sense of the output of second filter 65 is indicative of the cosine of such phase angle. Now, a reversal in the sense of the phase angle may be obtained by reversing the sense of the frequency difference between the clutter frequency and the system PRF. Such sense reversal in the phase angle will reverse the sense of the sine of a phase angle while not reversing the sense of the cosine of such phase angle. Accordingly, the output phase-sense of lowpass filter 64 will reverse upon a reversal of the frequency difference between the clutter center frequency and the PRF, but the output of filter 65 will not. Now, by injecting a further quadrature phase-shift between the two outputs of filters 64 and 65, a mutually in-phase or anti-phase relationship is provided between them, which relationship may be detected by third product detector 66, as indicated by the sense of the bipolar output thereof which is applied as an input to integrator 27.

There is further provided in the arrangement of the clutter frequency difference detector 26 of FIG. 4, gating means for limiting the range interval (and hence the look-angles) over which the clutter is measured, thereby reducing the spectral distribution thereof to that associated with target ranges of interest. Such gating means may be comprised of a gate 69 and 70 interposed at the output of each of detectors 61 and 62, and commonly controlled by a gating signal generator.

Frequently, the accuracy of a coherent Doppler processor is effected by frequency jitter in the transmitter carrier, whereby the receiver local oscillator frequency has been subsequently varied from that required for the carrier frequency at which a detected target was illuminated. Accordingly, it may be desirable to include means for providing a synthetic reference signal for coherent data processing purposes in accordance with the concept of U.S. application Ser. No. 389,299 filed Aug. 13, 1964, by Carl A. Wiley, assignor to North American Aviation, Inc., assignee of the subject patent application, as shown more particularly in FIG. 5.

Figure 5:
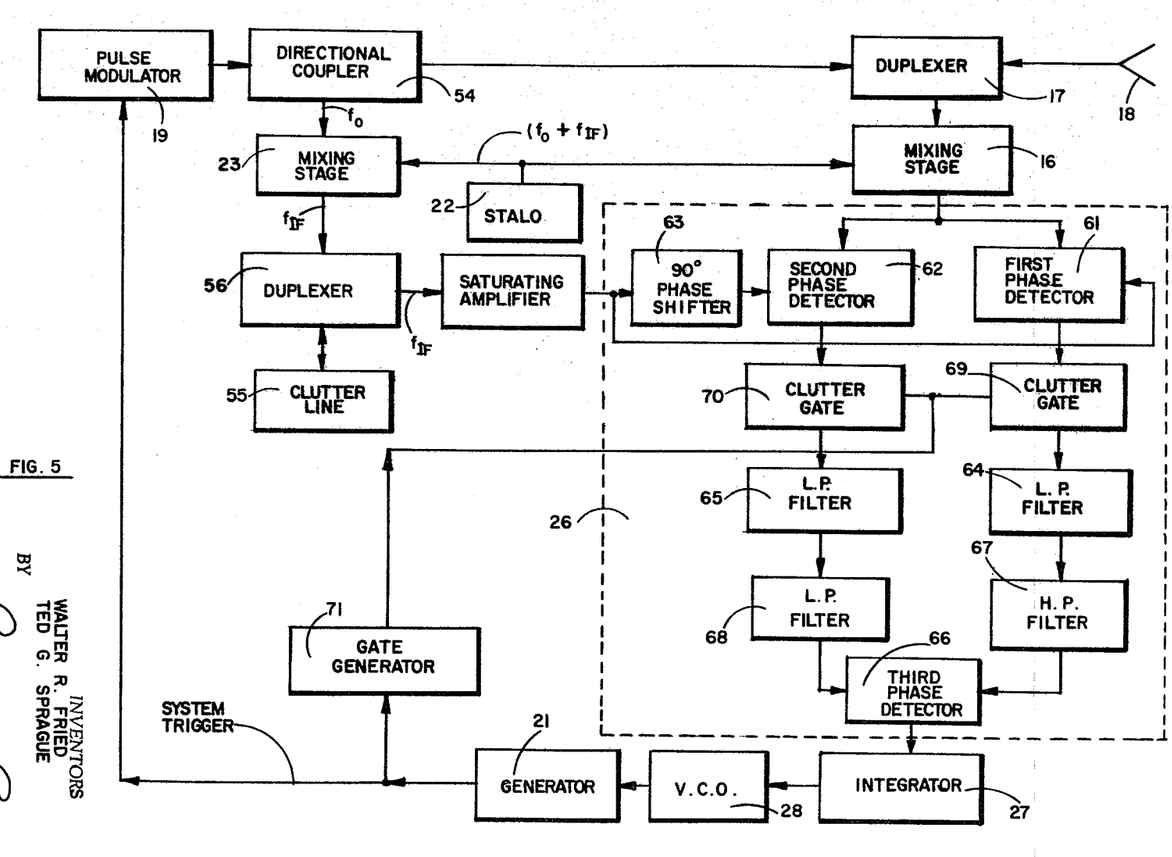
FIG. 5 is a block diagram of the coherent radar system of FIG. 4, employing a synthetic coherent reference source.

Referring to FIG. 5, there is illustrated a block diagram of the invention in which a synthetic coherent reference is employed. Instead of the coherent frequency arrangement of FIG. 1, STALO 22 provides the local oscillator input to receiver mixer 16 and to mixer 23, a second input of mixer 23 being connected to sample the transmitted energy from pulse modulator 19 by means of a directional coupler 54. The intermediate frequency output of mixer 23 is then coupled to a clutter storage line 55 by means of a duplexer 56. The stored sample of the intermediate frequency difference between the STALO frequency and the carrier frequency actually transmitted, thus stored by line 55, is then fed through a saturating amplifier 57 to provide an amplitude-invariant phase-reference of intermediate frequency for each of phase detectors 61 and 62.

Figure 6:
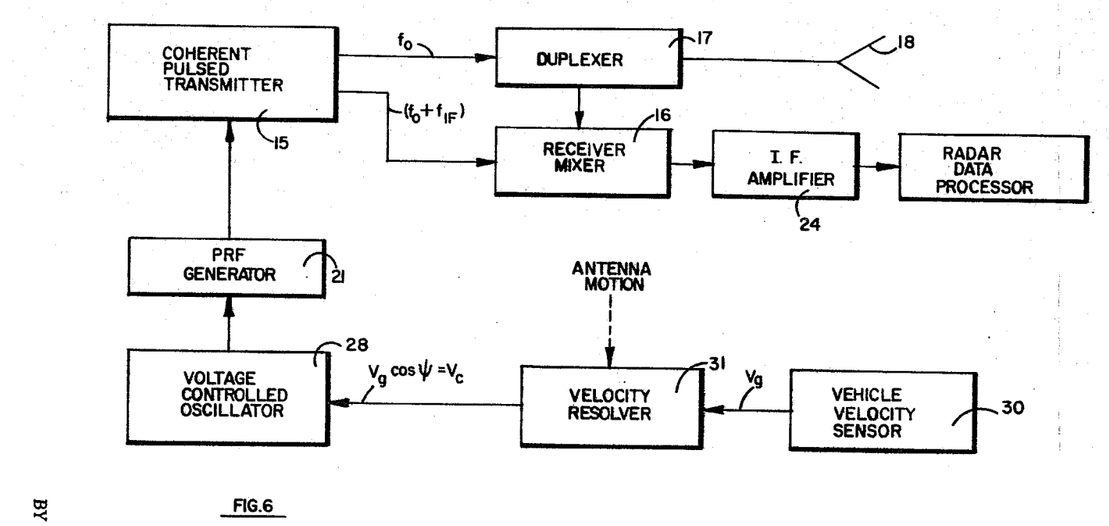
FIG. 6 is a block diagram of an open-loop arrangement, illustrating another aspect of the invention.

The use of an open-loop arrangement for slaving the system PRF in cooperation with a navigating aid in shown in FIG. 6. In such open-loop arrangement the output of a source 30 of vehicle velocity, such as a Doppler navigation radar or an inertial platform, is attenuated by a resolver 31, driven in accordance with the angle between the antenna boresight direction and the reference direction along which such velocity is determined. The attenuated or resolved output of resolver 31 is thus an analog indicative of a submultiple integer of the predicted clutter frequency, corresponding to the desired system trigger PRF, and is therefore applied to the control input of voltage-controlled oscillator 28 for controlling the PRF of pulse generator 21.

Because the system PRF of one aspect of the inventive concept is slaved to an integer submultiple of the clutter Doppler shift, as explained in connection with the description of FIGS. 1, 4 and 5, such platform motion technique may be employed in an azimuthally scanning system to provide Doppler navigation information. Such information may include vehicle velocity (ground speed) and drift angle, or, alternatively, heading velocity and cross-heading velocity components by resolving the clutter Doppler through use of the known motion of a scanning antenna, as shown more particularly in FIGS. 7 and 8.

Figure 7:
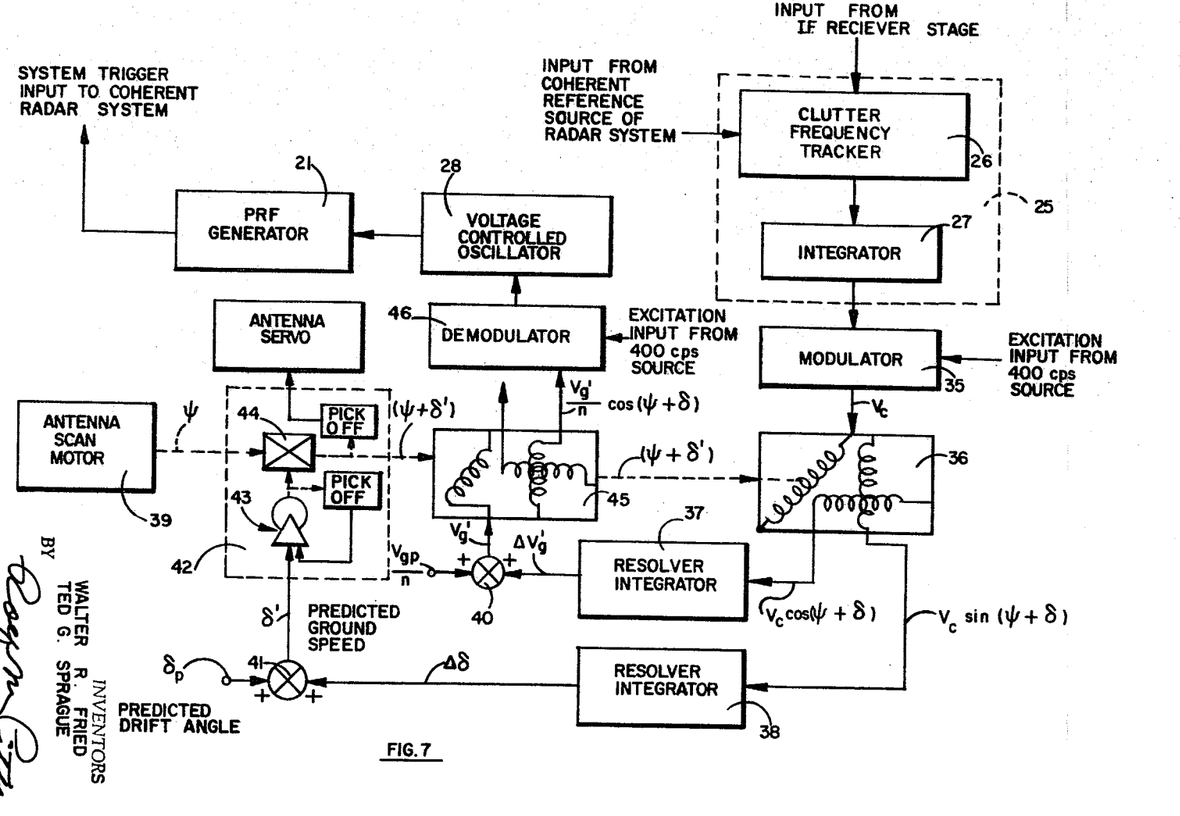
FIGS. 7 and 8 are block diagrams of Doppler navigation devices employing the inventive concept.

Referring to FIG. 7, there is illustrated a platform motion compensation and Doppler navigation device employing the frequency tracker of FIGS. 1, 4 and 5 to provide a first and second signal indicative of vehicle ground speed and drift angle, respectively. There is provided a modulator 35 responsively coupled to the output of DC integrator 27 for providing a modulated AC signal suitable for use by an AC resolver 36 which resolves the AC clutter frequency analog error signal into a first component resolved parallel to the vehicle ground track and a second horizontal component orthogonal to the vehicle ground track. Such resolved AC signals are then smoothed by means of respective AC integrators 37 and 38 or demodulator-modulators having time-constants or first order lags no less than the periodicity of the antenna scanning frequency (provided for a scan-motor 39) for smoothing the modulation envelopes of such AC signals. (The construction and arrangement of an exemplary modulator-demodulator having a shaping network for amplitude shaping of a modulated AC signal is shown, for example, in U.S. Patent 3,229,210 issued to A. A. Frank et al.) The velocity error output of first integrator 37 is combined with a signal indicative of a selected integer submultiple of a predicted ground speed $V_{gP}$ (which may be provided by relatively inaccurate speed measuring means, not shown) by first signal combining means 40. The velocity signal output of signal combining means 40, being indicative of ground speed $V_g'$, is then resolved by a second resolver 45 to provide a signal $V_g' \cos(\psi+\delta)$ indicative of the radial clutter velocity $V_c$ along a selected look angle direction $(\psi+\delta)$ relative to the ground track vector. This latter signal is demodulated by a demodulator 46 and fed to voltage controlled oscillator 28 for slaving the system PRF as explained previously in connection with FIGS. 1, 4, 5 and 6.

The output of the second integrator 38 is combined as a drift angle error signal with a signal indicative of a predicted drift angle $\delta_P$ (which may be provided by low accuracy drift angle computing means, not shown) by second signal combining means 41. The drift angle output signal $\delta'$ of combining means 41 is fed to differential means 42 which combines such signal with a mechanical input indicative of a programmed antenna scan angle $\psi$ (relative to the vehicle FRL) to provide a mechanically scanned output biased about the drift angle direction. Such combination may be effected by means of a position serve 43 having an electrical input responsive to such drift angle signal $\delta'$ for providing a mechanical input to a mechanical differential 44 which is also responsive to scanning motor 39. The mechanical output of differential 44 is sufficient to drive resolvers 36 and 45 and to also drive a pick-off for providing an electrical input to an antenna servo.

In normal operation of the arrangement of FIG. 7, the integrating servo element 43 of differential means 42 drives the reference position δ' of the antenna scanning motion and also resolvers 36 and 45 until the second resolved output $V_c \sin (\varphi+\delta')$ of resolver 36 is zero, indicating that such reference position now corresponds to the ground track direction. The variation in the outputs of first resolver 36 due to the scanning frequency of motor 39 will be attenuated by the responses of integrators 37 and 38, as to have little effect upon the calculated ground speed Vg' and drift angle δ'.

Because the second resolver 45 resolves the computed ground speed signal relative to the ground track direction, rather than the vehicle FRL, the resolved speed signal $$\frac{V_g'}{n} \cos (\varphi+\delta')$$

is an analog of the desired PRF to which the radar system trigger is to be slaved for minimizing unnecessary blind speeds. Any error in such computed PRF results in a clutter Doppler error input to integrator 27, resulting in adjustment of the system response. Accordingly, the outputs of summing means 40 and 41 may be employed as accurate sources of ground speed and drift angle, respectively.

Figure 8:
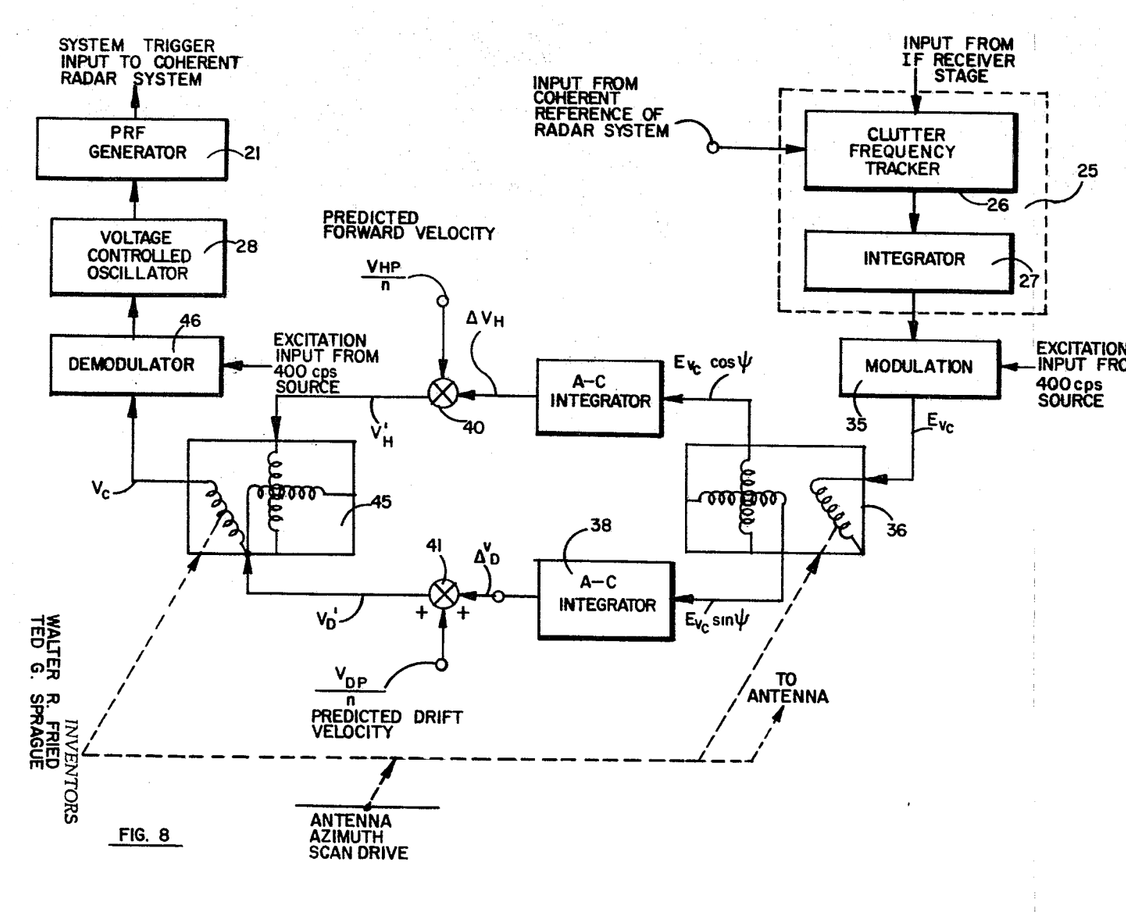

An alternate navigation computing and motion compensation arrangement for resolving the ground velocity relative to the vehicle FRL is shown in FIG. 8.

Referring now to FIG. 8, there is illustrated an alternate navigation computing and motion compensation arrangement, embodying the concept of the invention. There is provided a first and second resolver 36 and 45, first and second AC integrators 37 and 38, first and second signal combining means 40 and 41, and a modulator 35 and demodulator 46, as in the arrangement of FIG. 7, but arranged to cooperate in a slightly different manner. The rotors of resolvers 36 and 45 are commonly connected to the mechanical azimuth scan drive of a scanning antenna, the scanning motion of which is not necessarily biased to the vehicle ground speed vector direction but, instead is preferably referenced to the vehicle FRL. The output of each of signal combining means 40 and 41 is fed to a respective one of the stator inputs of second resolver 45. Hence, these inputs represent unresolved inputs of the analog ground clutter frequency submultiple, and therefore represent component velocities. Because the velocity signals from first resolver 36 are resolved parallel to and orthogonal of the vehicle FRL, such velocity signals are indicative of the heading and cross-heading velocity error. Accordingly, the predicted input signals applied at a respective one of signal combining means 40 and 41 represent predicted forward speed $V_{HP/n}$ and predicted drift or cross-velocity $V_{DP/n}$, which predicted inputs may be provided by a low accuracy navigator system (not shown).

In normal operation of such arrangement, the control input to oscillator 28 is varied in such a sense as to tend to reduce any clutter frequency error input to DC integrator 27, as explained previously in connection with the closed loop PRF control arrangements of FIGS. 1, 4, 5, and 7. Such error frequency may arise due to changes in predicted vehicle speed or errors in predicted velocity, resulting in compensatory changes in the system PRF. Hence, the outputs of summing means 40 and 41 provide highly accurate signal sources indicative of forward velocity $V_H$ and cross-velocity $V_D$, respectively. Such velocity signal sources may be employed, for example, in the damping of a Shuler-tuned inertial platform.

Accordingly, there has been described highly novel and useful means for slaving the system pulse repetition frequency of a coherent AMTI pulsed radar system to the clutter Doppler frequency. In this way, automatic platform motion compensation is provided, while the advantages of coherent Doppler processing are retained. In other words, the advantages of both non-coherent AMTI processing and coherent AMTI processing are achieved without suffering the disadvantages of each. Also, by slaving the system PRF to the clutter Doppler shift, the extent of blind speed regions is reduced, thereby increasing the probability of moving target detection. Moreover, such technique of slaving the system PRF to the clutter Doppler shift may be combined with inexpensive, low-accuracy navigation system sensors to provide highly accurate navigation data.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In a directionally-ranging pulsed energy system, closed loop means for improving the indicated distinction between a clutter background and a detected target moving radially of said system relative to said clutter background and comprising
    signal integrating means responsive to the centroid of the spectra of a sensed clutter background and to a pulse repetition frequency of the pulsed energy system for providing an output signal indicative of the time integral of the frequency difference therebetween; and
    voltage-controlled periodic signalling means responsively coupled to an output of said signal integrating means for varying said pulse repetition interval of said pulsed energy system.
2. The device of claim 1 in which there is further provided velocity resolving means responsive to the ranging direction of said directionally ranging system and interposed between said signal integrating means and said periodic signalling means for providing a signal indicative of the velocity vector of said pulsed energy system relative to said clutter background.
3. In a directionally ranging pulsed energy system, means for improving the indicated distinction between a clutter background and a detected target moving radially of said system relative to said clutter background, and comprising
    platform velocity sensing means for sensing the velocity of said pulsed energy system; and
    voltage controlled periodic signalling means responsively coupled to an output of said sensing means for varying a pulse repetition interval of said pulsed energy system.
4. The device of claim 3 in which said platform velocity sensing means includes a velocity resolver responsive to the ranging direction of said directionally ranging system for resolving said sensed velocity relative to said ranging direction.
5. In a directionally-ranging pulsed-energy system adapted for spaceborne use, means for improving the indicated distinction between a clutter background and a detected target moving radially of said system relative to said clutter background, comprising
    frequency-sensitive integrating means adapted to be responsive to detected clutter background spectra and a carrier frequency transmitted by said system for providing a control signal indicative of the time integral of the frequency differences between the respective inputs thereto; and
    voltage sensitive means comprising a pulse repetition frequency generator of said pulsed system coupled to the output of said integrating means for controlling the pulse repetition frequency of said pulse system in such a sense as to tend to reduce said frequency difference to null.
6. The device of claim 5 in which said system is an azimuthally scanning system and in which there is further provided navigation means for indicating the motion of a platform upon which said device is mounted, comprising
    ground speed indicating means interposed between the output of said integrating means and the input of said voltage sensitive means and including, a first azimuth resolver responsive to the output of said integrating means and the azimuthal scanning motion of said scanning system for providing a first and second output signal indicative of the product of the sine and cosine, respectively, of said azimuthal direction relative to a reference direction and the output of said integrating means;

second integrating means having a time-constant not less than the periodicity of said azimuthal scanning motion and responsively coupled to the first output of said first resolver;

means for combining a first selected signal indicative of a predicted ground speed with the output of said second integrating means to provide a ground speed signal; and a second resolver indicative of said responsive to said ground speed signal and said azimuthal scanning motion for providing a signal indicative of the product of said ground speed signal and the cosine of the azimuth angle of said scanning motion.

7. The device of claim 6 in which there is further provided means for indicating the drift angle of said ground speed relative to said reference direction comprising third integrating means having a time constant not less than the periodicity of said azimuth scanning motion and responsively coupled to the second output of said first resolver; and means for combining a second selected signal indicative of a predicted drift angle with the output of said third integrating means to provide a drift angle signal.

8. The device of claim 6 in which said first selected signal corresponds to a predicted forward ground speed in said reference direction and which there is further provided means for resolving said platform motion into a first and second ground speed component respectively parallel and orthogonal to said reference direction, including third integrating means having a time constant not less than the periodicity of said azimuthal scanning motion and responsively coupled to the second output of said first azimuthal resolver;

means for combining a second selected signal indicative of a predicted ground speed orthogonal to said reference direction and the output of said third integrating means to provide a drift velocity signal, said second azimuth resolver being further responsive to said drift speed signal.

9. In a directionally ranging pulsed energy system adapted for spaceborne use, means for improving the indicated distinction between a clutter background and a detected target moving radially of said system relative to said clutter background, comprising frequency sensitive means adapted to be responsive to a detected clutter background spectrum and to a carrier frequency transmitted by said system for providing an output signal indicative of the frequency difference between the respective inputs thereto, integrating means responsive to said output signal for providing a control signal indicative of the time interval of said output signal, and voltage sensitive periodic signalling means responsive to said control signal for controlling the pulse repetition frequency of said system in such a sense as to tend to reduce the magnitude of said frequency difference to a null.

10. The device of claim 9 in which said periodic signalling means comprises a voltage sensitive oscillator having a control input coupled to an output of said integrating means, a system trigger of said pulsed system being responsively connected to the output of said oscillator.

11. The device of claim 9 in which said frequency sensitive means comprises detection means responsive to echo signals received by a receiver of said system and having a phase reference coherently related to a transmitter carrier of said system for providing a detected signal.

12. The device of claim 11 in which said detection means comprises an intermediate frequency receiver channel having a first mixer input thereof responsive to said received echo signals and a second mixer input thereof responsive to a mixer input signal comprising said transmitter carrier translated in frequency by a source of an intermediate frequency, whereby said received signals are frequency-translated to an intermediate frequency corresponding to the frequency difference between said first and second mixer inputs; and phase-sensitive detection means having one input coupled to an output of said intermediate frequency receiver channel and a second input coupled to said source of said intermediate frequency.

13. The device of claim 11 in which said phase detection means comprises an intermediate frequency receiver channel having a first mixer input thereof responsive to said received echo signals and a second mixer input thereof responsive to a mixer input signal comprising said transmitter carrier translated in frequency by a source of an intermediate frequency, whereby said received signals are frequency-translated to an intermediate frequency corresponding to the frequency difference between said first and second mixer inputs;

first and second phase-sensitive detection means, each having one input coupled to an output of said intermediate frequency receiver channel and a second input coupled to said source of said intermediate frequency;

quadrature time-phase shifting means interposed between said second input to said second phase detection means and said source;

a third phase-sensitive detector having a first and second input responsively coupled to an output of a respective one of said first and second phase-sensitive detection means; and first and second phase-shifting means interposed between a corresponding input to said third phase-sensitive detector and the output of an associated one of said first and second phase-sensitive detectors for further adjusting the time-phase relationship between said inputs to said third detection means in a mutually quadrature time-phase relationship at said intermediate frequency, said integrating means being responsively coupled to the output of said third phase detector.

References Cited

UNITED STATES PATENTS

| | | | |
|---|---|---|---|
| 3,011,166 | 11/1961 | Fell et al. | 343—7.7 |
| 3,169,243 | 2/1965 | Kuhrdt | 343—7.7 |
| 3,308,458 | 3/1967 | Schulze | 343—7.7 X |

RODNEY D. BENNETT, *Primary Examiner.*

C. L. WHITHAM, *Assistant Examiner.*